United States Patent
Shimada

(10) Patent No.: US 8,255,833 B2
(45) Date of Patent: Aug. 28, 2012

(54) ELECTRONIC EQUIPMENT HAVING PLURAL FUNCTION KEYS ASSIGNABLE AT AN ARBITRARY HIERARCHICAL LEVEL IN A HIERARCHICAL MENU

(75) Inventor: Hirotoshi Shimada, Ome (JP)

(73) Assignee: TEAC Corporation, Tama-shi, Tokyo (JP)

( * ) Notice: Subject to any disclaimer, the term of this patent is extended or adjusted under 35 U.S.C. 154(b) by 994 days.

(21) Appl. No.: 12/029,945

(22) Filed: Feb. 12, 2008

(65) Prior Publication Data

US 2008/0201665 A1 Aug. 21, 2008

(30) Foreign Application Priority Data

Feb. 15, 2007 (JP) ................. 2007-035513

(51) Int. Cl.
*G06F 3/048* (2006.01)
(52) U.S. Cl. ..................................... 715/847
(58) Field of Classification Search .......... 345/168–169, 345/172–173, 156–158, 666; 715/835, 810, 715/841, 764, 847, 823, 210, 856, 808; 341/22, 341/E5.105; 340/825.22, 825.24
See application file for complete search history.

(56) References Cited

U.S. PATENT DOCUMENTS

| | | | | |
|---|---|---|---|---|
| 5,969,718 A * | 10/1999 | Mills et al. | ..................... | 715/827 |
| 6,275,217 B1 * | 8/2001 | Jaeger | ........................... | 345/172 |
| 6,353,444 B1 * | 3/2002 | Katta et al. | ..................... | 715/716 |
| 6,988,246 B2 * | 1/2006 | Kopitzke et al. | ............. | 715/810 |
| 7,134,094 B2 * | 11/2006 | Stabb et al. | .................... | 715/827 |
| 2002/0007487 A1 * | 1/2002 | Matsumoto et al. | ............ | 725/37 |
| 2003/0090471 A1 * | 5/2003 | Slaunwhite et al. | .......... | 345/172 |
| 2004/0001098 A1 * | 1/2004 | Numano | ....................... | 345/773 |
| 2006/0050142 A1 * | 3/2006 | Scott et al. | ................. | 348/14.05 |
| 2007/0139533 A1 | 6/2007 | Ohashi | | |
| 2007/0244875 A1 * | 10/2007 | Bodin et al. | ..................... | 707/4 |
| 2008/0126965 A1 * | 5/2008 | Shimotashiro et al. | ....... | 715/764 |

FOREIGN PATENT DOCUMENTS

| | | | |
|---|---|---|---|
| JP | 200430535 A | 1/2004 |
| JP | 2005267000 A | 9/2005 |
| JP | 2006101172 A | 4/2006 |

OTHER PUBLICATIONS

Non-Patent Literature: TASCAM (TEAC Professional) LAUNCHES DV-RA 1000HD Recorder press release (dated Oct. 2006). Tascam DV-RA 1000HD front panel image dated Oct. 12, 2006. Excerpts from the TASCAM DV-RA1000HD Owner's Manual, including front panel (p. 12), soft function keys (p. 13), menu tree (p. 22), and short cuts for screen access.*

(Continued)

*Primary Examiner* — Doon Chow
*Assistant Examiner* — Wilson Varga
(74) *Attorney, Agent, or Firm* — Seed IP Law Group PLLC

(57) ABSTRACT

Electronic equipment capable of registering and changing shortcut functions. When a menu is displayed on an LCD of electronic equipment, a list of shortcuts assigned to respective function keys on a home screen is displayed in the form of a split screen as a result of operation of any of the function keys. When a user selects a function to be assigned from the menu and selects a function key to be assigned, a selected function is assigned to the newly-selected function key.

7 Claims, 3 Drawing Sheets

OTHER PUBLICATIONS

Non-Patent Literature: Reenskaug, Trygve; "Models-Views-Controllers" published Dec. 10, 1979.*

IEEE Std 100-2000, vol., No. 2000, doi: 10.1109/IEEESTD.2000.322223, URL: http://ieeexplore.ieee.org/stamp/stamp.jsp?tp=&arnumber=4116808&isnumber=4116786, p. 470: function key definition.*

Seidman, Robert, "DVR Penetration Grows to 39.7% of Households, 42.2% of Viewers", Mar. 23, 2011, retreived from the internet http://tvbythenumbers.zap2it.com/2011/03/23/dvr-penetration-grows-to-39-7-of-households-42-2-of-viewers/ on Jul. 8, 2011.*

Office Action for Corresponding Japanese Application No. 2007-035513, mailed Jan. 18, 2011, with partial translation, 4 pages.

* cited by examiner

ELECTRONIC EQUIPMENT HAVING PLURAL FUNCTION KEYS ASSIGNABLE AT AN ARBITRARY HIERARCHICAL LEVEL IN A HIERARCHICAL MENU

PRIORITY INFORMATION

This application claims priority to Japanese Patent Application No. 2007-035513 filed on Feb. 15, 2007 which is incorporated herein by reference in its entirety.

BACKGROUND OF THE INVENTION

1. Technical Field

The present invention relates to electronic equipment having a plurality of function keys and, more particularly, to assignment of a shortcut function.

2. Related Art

There has heretofore been proposed a shortcut function that assigns desired functions and screens to a plurality of keys of electronic equipment and that enables performance of a desired function or an immediate shift to a desired screen by operation of only any of the keys.

JP 2005-267000 A describes processing, with a view toward curtailing operation steps up to completion of settings by means of assigning desired functions to a plurality of keys, for selecting an item of assignment key changing from menu entries, selecting a function desired to be assigned, and assigning the selected function to the selected assignment key.

JP 2006-101172 A describes processing intended for performing setting operation more simply within a shorter period of time through a smaller number of operations when setting operation pertaining to a single setting menu is performed again. Specifically, when a check button is performed while one of a plurality of hierarchical menu screens is being displayed, the menu screen being displayed is stored as a shortcut menu in memory. When a function button is operated with the menu screen being undisplayed, the menu screen stored in the memory appears on a viewfinder.

However, it is impossible to smoothly address a case where the function of a key changes from one screen to another, by means assigning a function and a screen by the selection of a key selection menu to shift a dedicated mode.

Moreover, registering a menu screen being displayed as a shortcut menu into memory and calling the menu screen enables activation of only a specific menu screen. When there are a plurality of function keys, how to assign functions to the plurality of function keys is not described.

SUMMARY

The present invention provides a device that efficiently assigns desired screens or functions to a plurality of function keys, thereby enhancing operability of a user.

According to the present invention, there is provided electronic equipment having a plurality of function keys, comprising:

a display device;

a display control unit for displaying on the display device a list of shortcut functions assigned to the plurality of function keys when a specific key is operated at an arbitrary hierarchical level of a hierarchical menu; and an assignment unit for newly assigning a shortcut function to any of the plurality of function keys while the list of shortcut functions is displayed.

In one embodiment, the electronic equipment is a recorder having a hard disk drive and an optical disk drive. When a function newly assigned by either the hard disk drive or the optical disk drive can be executed by the remaining drive, the assignment unit automatically assigns the function to an identical function key for the other disk drive.

According to the present invention, the state of assignment of shortcut functions can be readily, visually ascertained. Further, assignment of the shortcut functions can be readily changed.

The invention will be more clearly comprehended by reference to the embodiment provided below. However, the scope of the invention is not limited to the embodiment.

BRIEF DESCRIPTION OF THE DRAWINGS

A preferred embodiment of the present invention will be described in detail by reference to the following drawings, wherein.

DETAILED DESCRIPTION

An embodiment of the present invention will be described hereunder by reference to the drawings while a digital master recorder is taken as example electronic equipment.

Figure 1:
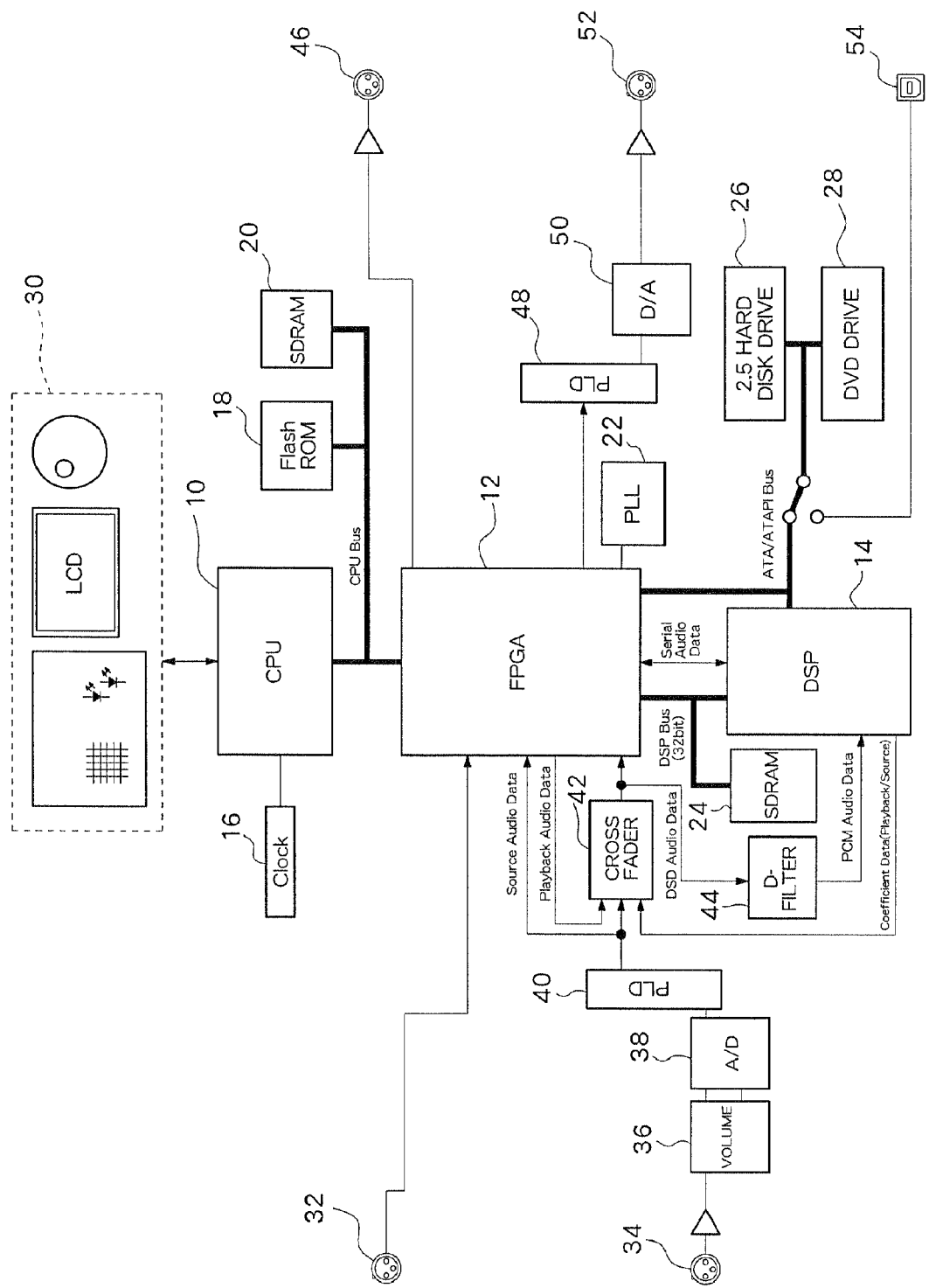
FIG. 1 is a schematic diagram of a digital master recorder of an embodiment of the present invention.

FIG. 1 shows the configuration of the digital master recorder of the embodiment. The digital master recorder has external input terminals, such as an analogue input terminal and a digital input terminal, and records an audio signal supplied from the external input terminal on a CD-R/RW, a DVD±R, or a DVD±RW. The digital master recorder has a built-in hard disk drive, and can record audio data also in the hard disk drive.

In FIG. 1, the digital master recorder has a CPU 10, an FPGA (Field Programmable Gate Array; that is, a programmable LSI) 12, a DSP 14, and a hard disk drive 26 and a DVD drive 28, as well.

The CPU 10 operates in accordance with a clock signal from a clock 16 and executes various processing operations pursuant to a command from a user interface block 30. A processing program for the CPU 10 is stored in flash ROM 18, and data processed by the CPU are stored in SDRAN 20 serving as work memory. The user interface block 30 has various keys, display LEDs for enabling visual ascertainment of an operating status, an LCD, and a rotary encoder. The rotary encoder is used for volume control, menu selection, and the like. The user interface block 30 is provided on a front panel of the digital master recorder.

The FPGA 12 is supplied with a digital audio signal from a digital input terminal 32, and the digital audio signal is supplied from an analogue input terminal 34 by way of a volume 36, an A/D 38, and a PLD (Programmable Logic Device) 40. The FPGA 12 operates in response to a clock signal from a PLL 22; serially exchanges audio data with the DSP 14; and outputs a processing result to a digital output terminal 46 or to an analogue output terminal 52 by way of a PLD 48 and a D/A 50. The CPU 10 controls operation of the DSP 14 by way of the FPGA 12; converts a signal input from the digital input terminal 32 or the analogue input terminal 34 into digital data by using SDRAM 24 as work memory; and stores the digital data into the hard disk drive 26 or writes (records) the digital data into a disk loaded in the DVD drive 28. The CPU 10 reads data from the hard disk drive 26 or a disk loaded in the DVD drive 28 by the FPGA 12, and writes (copies) the read data on a disk loaded in the DVD drive 28 or the hard disk drive 26. During recording or copying operation, data are stored in the hard disk drive 26 while being converted into a FAT file system. Data are written into the disk loaded in the DVD drive 28 after having been covered into a file format conforming to the type of the disk.

More specifically, the CPU 10 converts the format of the data read by way of the FPGA 12 by use of the SDRAM 24 serving as work memory. Format conversion is determined according to the type of the disk as mentioned above. A format conversion scheme may also be automatically selected according to the type of a disk, or a format conversion scheme selected by the user by use of the user interface block 30 may also be used. When the format conversion scheme is automatically selected, the CPU 10 acquires from the DVD drive 28 information about the type of the disk and sets a format conversion scheme (a file system to be converted). When the format conversion scheme is manually selected, the information input by way of the user interface block 30 is supplied to the CPU 10, whereupon the format conversion scheme (a file system to be converted) is set. The DSP 14 performs processing for converting a data format of an audio file, such as conversion of audio data into PCM audio data. The DSP 14 subjects an audio signal to various effect processing and supplies the processed signal to the FPGA 12. A fader 42 and a D-filter 44 are also used for various processing. The D-filter 44 is used at the time of generation of meter display data or conversion of DSD audio data into PCM audio data.

The hard disk drive 26 is of, for example, a 2.5-inch type and stores data in the form of a file system format of FAT-32.

The DVD drive 28 is a combo drive capable of driving a CD and a DVD and can drive a CD-R/RW, a DVD±R, and a DVD±RW.

An USB terminal 54 is provided on a rear panel of the digital master recorder and connected to a personal computer.

In the configuration such as that mentioned above, operation signals of various function keys and a rotary encoder (a jog dial) provided in the user interface block are supplied to the CPU 10. According to an operation signal, the CPU 10 displays a menu, or the like, on the LCD or performs selected processing as appropriate. However, the menu is hierarchical, and there are many cases where the user desires to select a desired menu screen or a desired function through simple operation at an arbitrary hierarchical level. Accordingly, the CPU 10 assigns shortcut functions to be performed at the time of display of a home screen to the plurality of respective function keys provided in the user interface block 30 in response to the user's operation. Data pertaining to assignment of the shortcut functions to respective function keys F1 to F5 are registered in the flash ROM 18.

Figure 2:
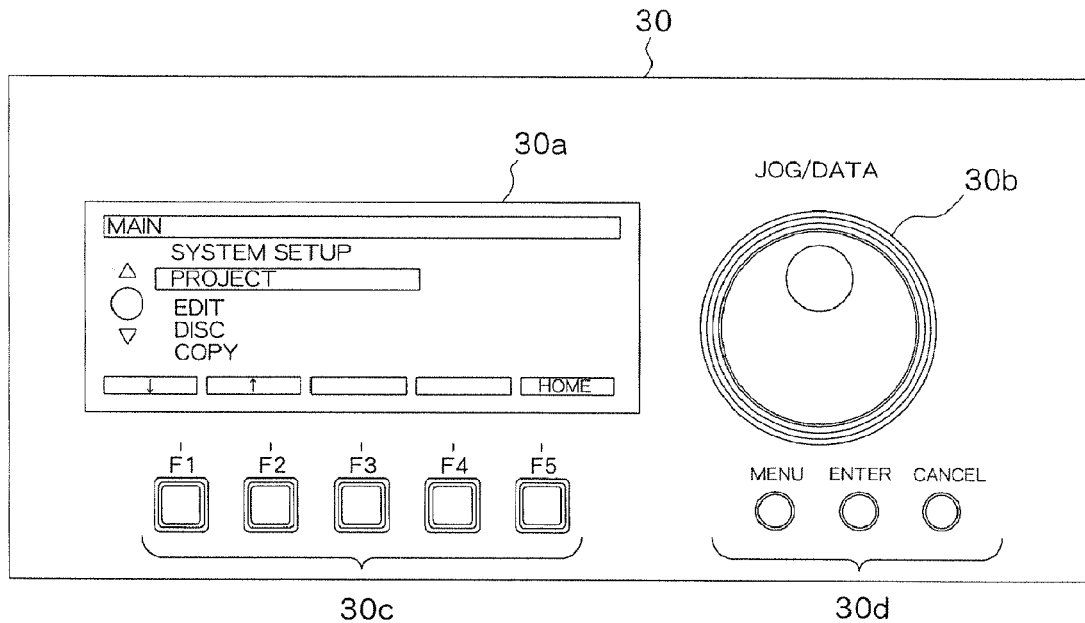
FIG. 2 is a schematic view of a user interface block.

FIG. 2 shows the configuration of the user interface block 30. The user interface block is provided with an LCD 30a serving as a display device and a rotary encoder (or a jog dial) 30b and operation keys 30d, which serve as user operation means. Further, a plurality of function keys 30c are provided below the LCD 30a. In the drawing, five keys F1 through F5 are provided as function keys. A variety of menus and pieces of information are hierarchically displayed on the LCD 30a. In the drawing, a main menu is displayed, and "SYSTEM SETUP," "PROJECT," "EDIT," "DISC," and "COPY" are displayed as entries of the main menu. Moreover, current functions of the five function keys F1 through F5 are displayed on the LCD 30a. In the drawing, F1 designates downward movement of a cursor; F2 designates upward movement of the cursor; and F5 designates movement of the cursor to a home screen. The cursor is also moved by rotationally operating the rotary encoder (jog dial) 30b. A "MENU" key, an "ENTER" key, and a "CANCEL" key are provided as the operation keys 30d. The "MENU" key is operated when a main menu is displayed; the "ENTER" key is operated when a selected entry is confirmed and registered; and the "CANCEL" key is operated when a selected entry is canceled.

Figure 3:
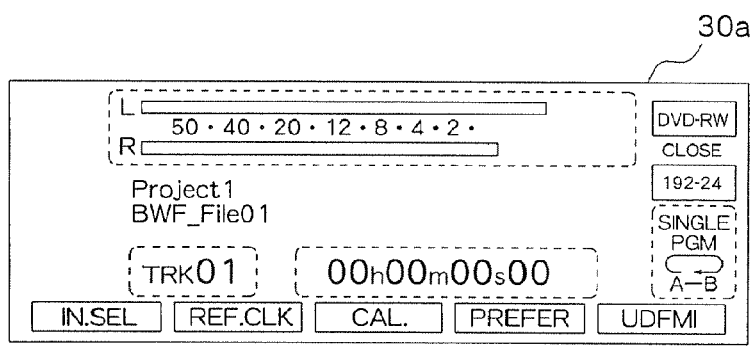
FIG. 3 is a descriptive display view of a home screen.

FIG. 3 shows an initial screen when the power of the digital master recorder is turned on. The initial screen is the home screen where various types of information are displayed. Display entries include the type of a meter or a disk, the status of a disk, an audio format of a current project, the designation of a current project, the designation of a current file, a current track number, a display of a time of a track being played back, a playback mode display, and the like. Default shortcut functions of the function keys are also displayed. In the drawing, F1 designates "I/O SELECT" (input selection); F2 designates "REFERENCE CLOCK" (a reference clock); F3 designates "CALENDAR" [a calendar (setting of a date and time)]; F4 designates "PREFERENCE" (a preference); and F5 designates "SAVE UDF MANAGEMENT INFORMATION." When "MENU" of the function key is operated on the home screen, the screen shifts to the main menu.

Figure 4:
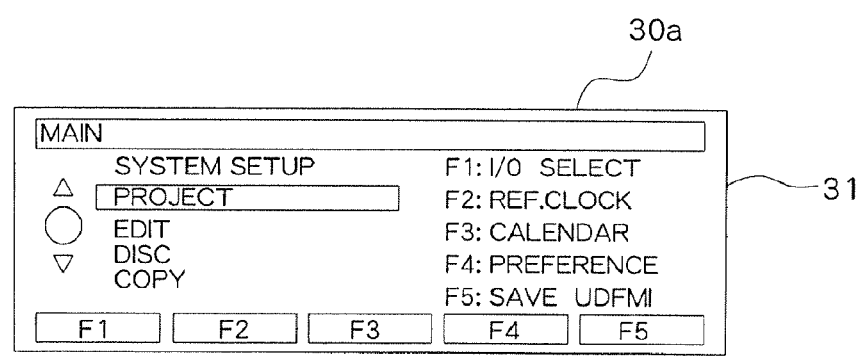
FIG. 4 is a descriptive display view of a main menu screen.

FIG. 4 shows a main menu screen. As shown in FIG. 2, "SYSTEM SETUP," "PROJECT," "EDIT," "DISC," and "COPY" are displayed as a main menu. When the F3 key is operated as a specific key on the main menu screen, a current shortcut list 31; namely, a list of assignment of shortcuts to the respective function keys achieved at the time of display of the home screen, is displayed on the LCD 30a in the form of a split screen simultaneously with the main menu entries. In the drawing, the shortcut list is displayed on the right side of the screen of the LCD 30a in the form of a split screen, and the main menu entries are displayed on the left side of the screen in the form of a split screen. As illustrated, so long as the shortcut function remains as in a default state, F1=I/O SELECT, F2=REF. CLOCK, F3=CALENDAR, F4=PREFERENCE, F5=SAVE UDFMI are displayed. By visually ascertaining the shortcut list, the user can readily, visually ascertain the shortcut functions currently assigned to the function keys F1 through F5.

The F3 key does not only display the shortcut functions assigned to the respective function keys F1 through F5 but also act as a change key at the time of changing of the currently-assigned shortcut function while displaying the main menus. Specifically, when the shortcut list 31 is displayed, the displayed main menu serves as menu entries to be newly assigned shortcut functions, and the user selects a desired menu from the main menu entries by operating the rotary encoder 30b. When an "ENTER" key is operated by actuating the function key to which the selected menu is desired to be assigned as a shortcut function, the CPU 10 registers the menu selected by the selected function key as a new shortcut function. For instance, in FIG. 4, the user selects "EDIT" from the main menu and operates F4 as the function key, the shortcut function of the F4 key is changed from default "PREFERENCE" to "EDIT." After the shortcut function has been thus changed, when the shortcut list 31 is displayed as a result of operation of the F3 key, the CPU displays "EDIT" as a shortcut function of the F4 key. Further, when the F4 key is operated on the home screen, the screen immediately shifts to a setting screen for executing the "EDIT" function (an edit function) assigned to the F4 key.

Foregoing processing is performed when the F3 key is operated on the main menu screen. However, the same also applies to the case where the F3 key is operated at an arbitrary hierarchical level in the hierarchical menu. When the F3 key is operated in each hierarchical level, the shortcut function currently assigned to the home screen is displayed as the shortcut list 31 on the LCD 30*a* in the form of a split screen. A desired function or screen can be assigned to a desired function key by selecting a menu to be newly assigned, operating a function key to which the menu is to be assigned, and operating the "ENTER" key.

Figure 5:
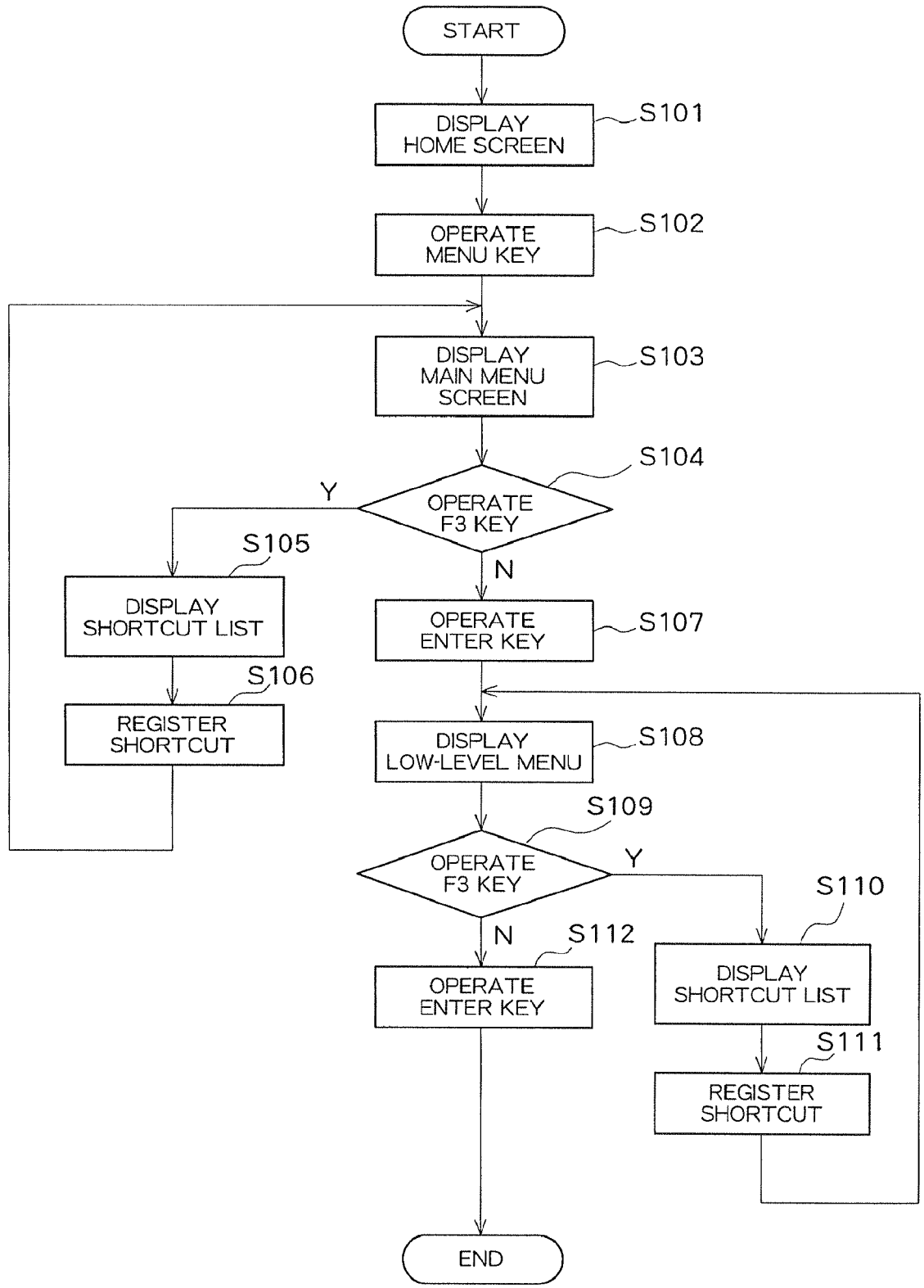
FIG. 5 is a flowchart of processing performed in the embodiment.

FIG. 5 shows a flowchart of processing of the digital master recorder of the present embodiment. When the power of the recorder is turned on, the CPU 10 displays a home screen on the LCD 30*a* (S101). When the user operates the "MENU" key (S102), an operation signal is supplied to the CPU 10, and the CPU 10 displays the main menu screen in place of the home screen on the LCD 30*a* (S103). When the user operates the F3 key with the main menu screen being displayed (YES in S104), an operation signal is supplied to the CPU 10, and the CPU 10 displays the shortcut functions currently assigned to the respective function keys F1 through F5 as the shortcut list 31 on the LCD 30*a* in the form of a split screen (S105). The currently-assigned shortcut functions are registered in the flash ROM 18, and the CPU 10 reads the registration data stored in the flash ROM 18 and displays the thus-read data on the LCD 30*a*. Among the function keys F1 through F5, the keys assigned no shortcut functions can be displayed in the form of blank fields. The user operates the rotary encoder 30*b* while the shortcut list 31 is displayed, to thus select a desired menu entry from the main menu is entries; or the user selects a desired function key and operates the "ENTER" key. A selection signal is supplied to the CPU 10, and the CPU 10 assigns the newly-selected menu entry to the selected function key as a shortcut function, and the menu entry is registered in the flash ROM 18 through overwriting (S106). When registration of the new shortcut function is completed, the CPU 10 returns the screen of the LCD 30*a* to the main menu screen (S103). When the F3 key is again operated after display of the main menu screen, the CPU 10 displays the new shortcut list 31 on the LCD 30*a*. Specifically, shortcut functions newly registered through previous registration operation are displayed in the form of a list.

In the meantime, when the user operates the "ENTER" key by selecting any one from the menu entries without operating the F3 key while the main menu screen is displayed (NO in S104, and S105), an operation signal is supplied to the CPU 10, and the CPU 10 displays a low-level menu regarding the selected menu (S108).

When the user again operates the F3 key after display of the low-level menu (YES in S109), an operation signal is supplied to the CPU 10. The CPU 10 displays, as the shortcut list 31 on the LCD 30*a* in the form of a split screen, the shortcut functions currently assigned to the respective function keys F1 through F5 at the time of display of the home screen (S110). The currently-assigned shortcut functions are registered in the flash RON 18, and the CPU 10 reads the registration data stored in the flash ROM 18 and displays the thus-read data on the LCD 30*a*. Of the function keys F1 through F5, keys assigned no shortcut functions are displayed as blank fields. The user operates the rotary encoder 30*b* with the shortcut list 31 being displayed, to thus select a desired menu entry from the low-level menu, or the user selects a desired function key and operates the "ENTER" key. A selection signal is supplied to the CPU 10, and the CPU 10 assigns a newly-selected menu entry to the selected function key as a shortcut function and registers the function in the flash ROM 18 through overwriting (S111). Alternatively, a low-level menu currently being displayed may also be assigned to a selected function key as a shortcut function when the user selects a desired function key while the shortcut list 31 is displayed and operates the "ENTER" key. After completion of registration of a new shortcut function, the CPU 10 returns the screen of the LCD 30*a* to the low-level menu screen display (S108). When the user operates the "ENTER" key without operating the F3 key by selection of a desired menu entry from the low-level menu, the selected menu entry is executed (NO in S109, and S112). In short, if an arbitrary menu (function) is frequently used later during the course of settings, or the like, being made by calling the menu (function), the menu (function) will be registered on the home screen as a shortcut. In the digital master recorder, the roles of the respective function keys change in accordance with a menu (function) being called. The function keys are displayed on the LCD 30*a* such that roles of the respective function keys achieved in the menu (function) currently being called can be visually ascertained. The user does not ascertain the current state of registration of the shortcuts on the home screen in the middle of a certain menu (function) being called. Hence, the shortcut list 31 of the home screen is displayed by operation of a specific key (F3 key).

As mentioned above, in the present embodiment, the state of registration of shortcuts of the home screen is displayed in the form of a list by means of the user operating the F3 key at an arbitrary level in the hierarchical menu. Therefore, the user can comprehend the current state of registration of the shortcuts in a more intuitive manner. Concurrently with the shortcut list being displayed by operation of the F3 key, the screen shifts to a shortcut registration mode. Therefore, assignment of a shortcut function can be changed readily. Specifically, the user can change assignment of a shortcut function by means of only operating the F3 key to display a shortcut list and selecting a function key to which a function is desired to be assigned. In the present embodiment, a shortcut list is displayed by operating the F3 key at an arbitrary hierarchical level. Hence, the present invention is especially effective for a case where the number of function keys is limited and where keys utilized for shortcuts exhibit various functions as function keys on respective screens other than the home screen.

In the present embodiment, assignment of a shortcut function can also be dynamically performed. For instance, when continual use of a certain function only for a certain period is previously forecast, the function is first registered when called from the menu. Even when the function is desired to reset the originally-registered function, all you have to do is to re-register the function at the time of use of it.

As shown in FIG. 1, the digital master recorder of the present embodiment is equipped with the hard disk drive 26 and the DVD drive 28. Menu entries appearing on the LCD 30*a* can also change according to a currently-operating drive. However, shortcut keys can be commonly assigned in relation to common menu entries of the drive. For example, when the DVD drive 28 is operating, "EDIT" is assigned to the F1 key. Alternatively, when the hard disk drive 26 is operating, "EDIT" is assigned to the F1 key in a default state. Thus, consistency can be imparted to user's operability regardless of a drive to be driven. Naturally, in a case where a function that is not common between the DVD drive 28 and the hard disk drive 26; for example, a function unique to the DVD drive 28, is assigned to a certain key, it is desirable to invalidate the assignment and reset the key to a default state when the hard disk drive 26 is driven. When a function common between the DVD drive 28 and the hard disk drive 26 is assigned, the function may also be displayed oh the LCD 30*a* so as to be distinguishable from uncommon functions. For instance, common functions are displayed in a different color on the LCD 30a, or the like. Common assignment or invalidation of an assignment can be performed not only between the DVD drive 28 and the hard disk drive 26 but also among a plurality of DVD disks driven by the DVD drive 28. For example, in relation to functions for which commonality is sought between the case of driving of a CD and the case of driving of a DVD or functions for which commonality is sought between the case of driving of a DVD±R and the case of driving of a DVD±RW, assignment of the functions is made common. In relation to a function for which commonality is not sought, when a disk not having that function is driven, the assignment is invalidated, to thus be reset to a default state or a blank. As mentioned previously, assignment data are registered in the flash ROM 18 for each hierarchical level. Assignment data are further registered for each operational drive, whereby assignment of shortcut functions to the respective function keys can be changed on a per-drive basis. Further, common functions can be assigned commonly. Specifically, in relation to a function common between the DVD drive 28 and the hard disk drive 26, the essential requirement is to automatically change an assignment, at a point in time when an assignment is first changed in any drive and when the change is registered in the flash ROM 18, in the other drive.

In the present embodiment, the shortcut key list is displayed, and the F3 key is used as a specific key for shifting the mode to the shortcut registration mode. However, another arbitrary key can be used. Since the key acts as a trigger for displaying a list of shortcuts assigned to the function keys, it is desirable to select any of the function keys as a specific key.

What is claimed is:

1. Electronic equipment having a plurality of function keys, wherein,
    the function keys have different functions in respective hierarchical levels of a hierarchical menu; and
    the electronic equipment comprises:
        a display device configured to display functions of the function keys in each hierarchical level and also to display shortcut functions of the function keys in an initial screen; and
        an assignment unit configured to display on the display device a list of the shortcut functions in the initial screen assigned to the plurality of function keys when a defined key is operated at an arbitrary hierarchical level of the hierarchical menu, and further configured to shift to a shortcut registration mode and to newly assign a shortcut function to one of the function keys of the initial screen while the list of the shortcut functions of the initial screen is displayed.

2. The electronic equipment according to claim 1, wherein the electronic equipment is a recorder having a hard disk drive and an optical disk drive.

3. The electronic equipment according to claim 2, wherein, when a shortcut function newly assigned for the hard disk drive can be executed by the optical disk drive, the assignment unit automatically assigns the shortcut function to an identical function key for the optical disk drive.

4. The electronic equipment according to claim 2, wherein, when a shortcut function newly assigned for the optical disk drive can be executed by the hard disk drive, the assignment unit automatically assigns the shortcut function to an identical function key for the hard disk drive.

5. The electronic equipment according to claim 1, wherein the display control unit is further configured to display on the display device a hierarchical level at which the defined key is operated.

6. The electronic equipment according to claim 5, wherein the assignment unit includes
    a unit configured to select a shortcut function; and
    a unit configured to select, from the plurality of function keys, a function key to which the selected shortcut function is to be assigned.

7. The electronic equipment according to claim 1, wherein the defined key is one of the plurality of function keys.

* * * * *